United States Patent
Holbrook et al.

(10) Patent No.: US 11,900,254 B2
(45) Date of Patent: *Feb. 13, 2024

(54) SYSTEM AND METHOD FOR MULTI-TASK LEARNING

(71) Applicant: STATS LLC, Chicago, IL (US)

(72) Inventors: Matthew Holbrook, Chicago, IL (US); Jennifer Hobbs, Chicago, IL (US); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,262

(22) Filed: Feb. 27, 2023

(65) Prior Publication Data

US 2023/0222340 A1 Jul. 13, 2023

Related U.S. Application Data

(63) Continuation of application No. 16/804,914, filed on Feb. 28, 2020, now Pat. No. 11,593,647.

(60) Provisional application No. 62/812,511, filed on Mar. 1, 2019.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .................................. G06N 3/04; G06N 3/08
See application file for complete search history.

(56) References Cited

U.S. PATENT DOCUMENTS

| | | |
|---|---|---|
| 2008/0281444 A1 | 11/2008 | Krieger et al. |
| 2014/0201126 A1* | 7/2014 | Zadeh ............. A61B 5/165 706/52 |
| 2017/0165570 A1 | 6/2017 | Lucey et al. |

(Continued)

OTHER PUBLICATIONS

Zhao, et al., "Applying deep bidirectional LSTM and mixture density network for basketball trajectory prediction", Science Direct, Optik, vol. 158, Apr. 2018, pp. 266-272.

(Continued)

*Primary Examiner* — Angelica Ruiz
(74) *Attorney, Agent, or Firm* — Bookoff McAndrews, PLLC

(57) ABSTRACT

A method of generating a multi-modal prediction is disclosed herein. A computing system retrieves event data from a data store. The event data includes information for a plurality of events across a plurality of seasons. Computing system generates a predictive model using a mixture density network, by generating an input vector from the event data learning, by the mixture density network, a plurality of values associated with a next play following each play in the event data. The mixture density network is trained to output the plurality of values near simultaneously. Computing system receives a set of event data directed to an event in a match. The set of event data includes information directed to at least playing surface position and current score. Computing system generates, via the predictive model, a plurality of values associated with a next event following the event based on the set of event data.

20 Claims, 7 Drawing Sheets

(56) References Cited

U.S. PATENT DOCUMENTS

| | | | |
|---|---|---|---|
| 2018/0001215 A1 | 1/2018 | Lazarus et al. | |
| 2018/0204111 A1* | 7/2018 | Zadeh | G06V 10/764 |
| 2019/0228290 A1 | 7/2019 | Ruiz et al. | |
| 2019/0251743 A1* | 8/2019 | Koyama | G01C 21/36 |
| 2019/0384790 A1* | 12/2019 | Bequet | G06N 3/084 |

OTHER PUBLICATIONS

Ellefsen, et al., "How do Mixture Density RNNs Predict the Future?" arXiv preprint arXiv:1901.07859, Jan. 23, 2019, 10 pages.

Harmon, et al., "Predicting Shot Making in Basketball Learnt from Adversarial Multiagent Trajectories", arXiv preprint arXiv: 1609.04849, Dec. 28, 2017, 23 pages.

Sha, et al., "Chalkboarding: A New Spatiotemporal Query Paradigm for Sports Play Retrieval", IUI 2016: Information Retrieval and Search, Mar. 2016, pp. 336-347.

Slowinski, "What is WAR?", FANGRAPHS, http://www.fangraphs.com/library/misc/war/, Feb. 15, 2010.

Cervone, et al., "POINTWISE: Predicting points and valuing decisions in real time with NBA optical tracking data", Proceedings of the 8th MIT Sloan Sports Analytics Conference, vol. 28, Feb. 2014.

Bishop, "Mixture density networks", Neural Computing Research Group Report:004, Feb. 1994.

Lucey, et al. "Quality vs Quantity: Improved shot prediction in soccer using strategic features from spatiotemporal data", 8th Snnual MIT Sloan Sports Analytics Conference, Feb. 2015.

Football Outsiders, "Methods to Our Madness", EdjSports, LLC, https://www.footballoutsiders.com/info/methods, printed Apr. 17, 2020.

Beuoy, "Updated NBA Win Probability Calculator", inpredictable, https://www.inpredictable.com/2015/02/updated-nba-win-probability-calculator.html, Feb. 6, 2015.

Pelechrinis, "iWinrNFL: A Simple and Well-Calibrated In-Game NFL Win Probability Model", Arxiv: Statistical Applications, Apr. 2017.

Ganguly, et al., "The problem with win probability", 12th MIT Sloan Sports Analytics Conference, 2018.

Yue, et al., "Learning fine-grained spatial models for dynamic sports play prediction", IEEE international conference on data mining, 2014.

Miller, et al., "Factorized point process intensities: A spatial analysis of professional basketball", International conference on machine learning, 2014.

Goldsberry, "Courtvision: New visual and spatial analytics for the NBA", 2012 MIT Sloan Sports Analytics Conference, vol. 9, 2012.

Cheng, et al., "Wide & deep learning for recommender systems", Proceedings of the 1st workshop on deep learning for recommender systems, Sep. 2016.

Caruana, "Multitask Learning", Machine Learning, 28, Kluwer Academic Publishers, pp. 41-75, 1997.

\* cited by examiner

SYSTEM AND METHOD FOR MULTI-TASK LEARNING

CROSS-REFERENCE TO RELATED APPLICATIONS

This is a continuation of U.S. patent application Ser. No. 16/804,914, filed Feb. 28, 2020, which claims priority to U.S. Provisional Application Ser. No. 62/812,511, filed Mar. 1, 2019, which are incorporated by reference in their entireties.

FIELD OF THE DISCLOSURE

The present disclosure generally relates to system and method for generating a multi-modal prediction.

BACKGROUND

For the past decade in sports analytics, the holy grail has been to find the "one best metric," which can best capture the performance of players and teams through the lens of winning. For example, expected metrics such as wins-above replacement (WAR) in baseball, expected points value (EPV) and efficiency metrics in basketball, and expected goal value in soccer are used as the "gold-standard" in team and player analysis. In American football, defense-adjusted value over average (DVOA) is, perhaps, the most respected and utilized advanced metric in the NFL. DVOA utilizes both an expected value and efficiency metric and analyzes the value of a play compared to expected for every play, and also normalizes the value for team, drive, and game context.

SUMMARY

Embodiments disclosed herein generally relate to a system and method for generating a multi-modal prediction. In some embodiments, a method of generating a multi-modal prediction is disclosed herein. A computing system retrieves event data from a data store. The event data includes information for a plurality of events across a plurality of seasons. The computing system generates a predictive model using a mixture density network, by generating an input vector from the event data learning, by the mixture density network, a plurality of values associated with a next play following each play in the event data. The input vector includes one or more parameters associated with each play in the event data. The mixture density network is trained to output the plurality of values near simultaneously. The computing system receives a set of event data directed to an event in a match. The set of event data includes information directed to at least playing surface position and current score. The computing system generates, via the predictive model, a plurality of values associated with a next event following the event based on the set of event data. The plurality of values is determined near simultaneously.

In another embodiment, a system for generating a multi-modal prediction is disclosed herein. The system includes a processor and a memory. The memory has programming instructions stored thereon, which, when executed by the processor performs one or more operations. The one or more operations include retrieving event data from a data store. The event data includes information for a plurality of events across a plurality of seasons. The one or more operations further include generating a predictive model using a mixture density network, by generating an input vector from the event data and learning, by the mixture density network, a plurality of values associated with a next play following each play in the event data. The input vector includes one or more parameters associated with each play in the event data. The mixture density network is trained to output the plurality of values near simultaneously. The one or more operations include receiving a set of event data directed to an event in a match. The set of event data includes information directed to at least playing surface position and current score. The one or more operations include generating, via the predictive model, a plurality of values associated with a next event following the event based on the set of event data. The plurality of values is determined near simultaneously.

In another embodiment, a non-transitory computer readable medium including one or more sequences of instructions that, when executed by the one or more processors, causes one or more operations. A computing system retrieves event data from a data store. The event data includes information for a plurality of events across a plurality of seasons. The computing system generates a predictive model using a mixture density network, by generating an input vector from the event data learning, by the mixture density network, a plurality of values associated with a next play following each play in the event data. The input vector includes one or more parameters associated with each play in the event data. The mixture density network is trained to output the plurality of values near simultaneously. The computing system receives a set of event data directed to an event in a match. The set of event data includes information directed to at least playing surface position and current score. The computing system generates, via the predictive model, a plurality of values associated with a next event following the event based on the set of event data. The plurality of values is determined near simultaneously.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
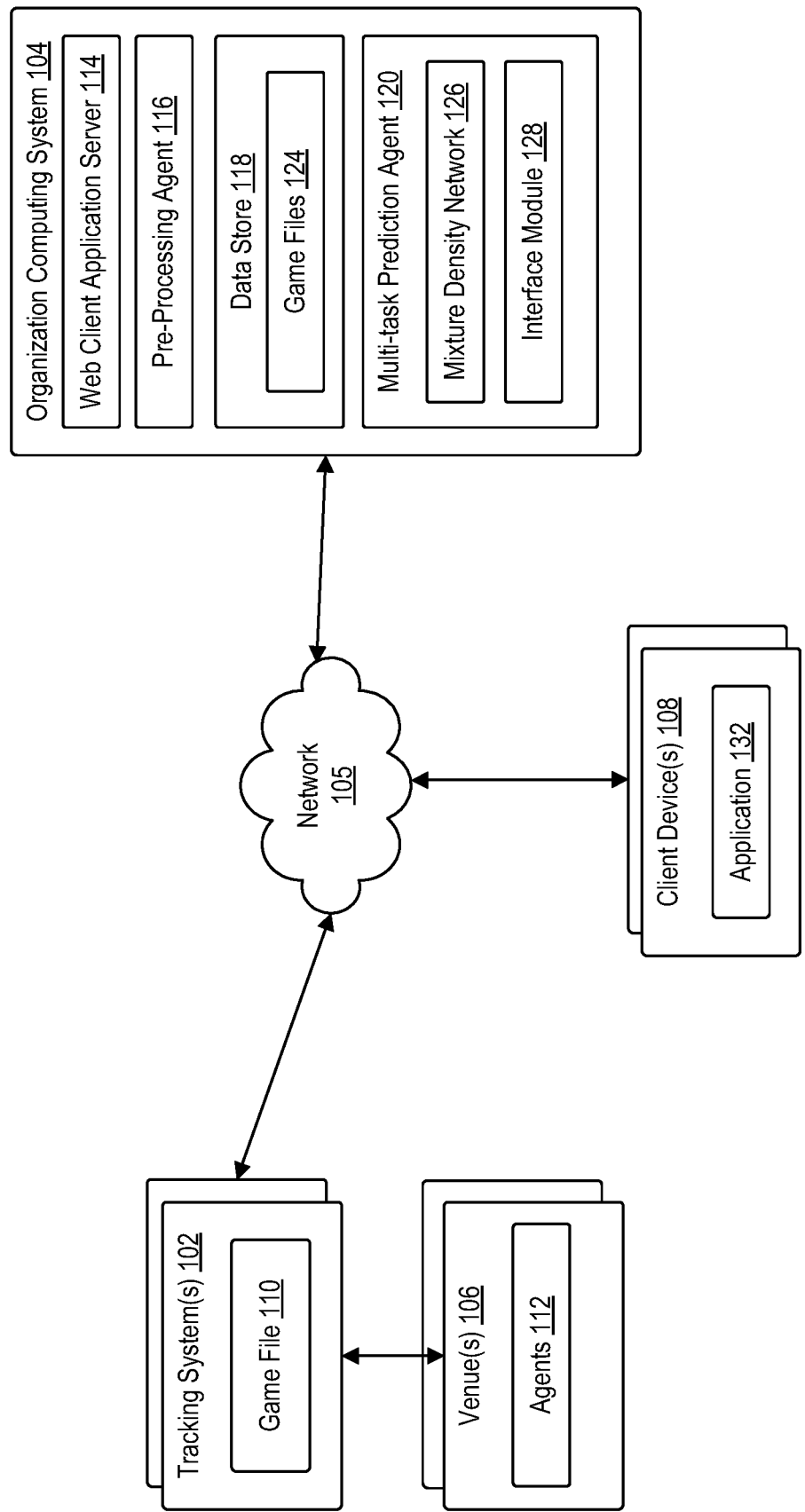
FIG. 1 is a block diagram illustrating a computing environment, according to example embodiments.

Conventional approaches to sports analytics attempt to use a single metric to explain all performance. However, the hypothesis of having a single metric to explain all performance is limiting. By its very nature, sport is complex and lends itself to many queries for different contexts and temporal resolutions. Instead of having a single predictor (or metric), may predictors may be needed to enable such analyses. For example, if a team has won the title, various predictors may be used to highlight the team's dominant attributes across the season (e.g., offensively and/or defensively strong, and if so, which locations and times). In another example, if a team has won or lost a single match, various predictors may be used to highlight which plays or play was decisive or of note.

While a multitude of predictors may be used to enable multi-resolution analyses, there should be a single source or brain that generates such predictors. For example, if a system is predicting the expected point value of a drive in American Football and that jumps based on a big play, that should be correlated/co-occurring with a jump with the win probability—otherwise, this would possibly be contradictory and cause the user not to trust the model. Additionally, predictors should go beyond "expected metrics," which compare solely to the league average and produce distributions to enable deeper analysis (e.g., instead of comparing to the league average, comparing to the top 20% or 10% of teams). To effectively provide such predictions, the system may need several ingredients: (1) a fine-grained representation of performance at the play-level which may be aggregated up to different resolutions; (2) fine-grained spatial data to enable the representation; (3) a multi-task learning approach in which the predictors are trained simultaneously; and (4) a method which can generate distributions instead of point values.

The one or more techniques described herein provide a way to perform multi-resolution or multi-task predictions. For example, the below discussion focuses on the sport of rugby, and how the system can learn and make multi-task predictions. Although the below discussion focuses on the sport of rugby, those skilled in the art understand that such operations should not be limited to rugby. For example, such operations may be applied to basketball, football, hockey, baseball, soccer, and the like, substituting similar data for the data used herein.

Rugby League is a continuous and dynamic game played between two teams of thirteen players (e.g., seven forwards and six backs) across two, forty minute, halves with the goal of "scoring a try" and obtaining points by carrying the ball across the opponent's goal-line. Rugby League has numerous similarities to American Football: it is played on a similar size pitch (e.g., 100 m×70 m) with a set of six tackles per possession (compared to four downs in American Football), in which a team has the opportunity to score a try. The scoring convention of Rugby League is: four points for a try and two points for the subsequent successful conversion; two points for a successful penalty kick; and one point for a successful field-goal.

The most popular Rugby League competition in the world is the National Rugby League (NRL), which includes sixteen teams across Australia and New Zealand. The NRL is the most viewed and attended Rugby League competition in the world. The 2018 NRL season was particularly noteworthy, as it was the most competitive regular season in history of the league (and possibly in all of sport). After twenty-five rounds of regular season competition (where each team plays twenty-five games), the top eight teams were separated by one win. Specifically, the top four teams (Roosters, Storm, Rabbitohs, and Sharks) all finished with sixteen wins. The next four teams (Panthers, Broncos, Warriors, and Tigers) finished with fifteen wins. The minor premiership—which goes to the team that finishes first during the regular season—was determined by point differential. The Sydney Roosters won the minor premiership for the fourth time in the past six years. To achieve this feat, the Roosters had to beat the Parramatta Eels by a margin of twenty-seven points on the last day of the regular season, which they did with a 44-10 victory. The result meant they pushed the Melbourne Storm out of the top spot, with a point differential of just +8. Given the closeness of the competition, it would be useful to have many measurement tools to dissect how the league was won.

The one or more approaches described herein provide such multi-task prediction techniques through a combination of machine learning approaches. First, the system described herein utilizes wide and deep models used for recommendations tasks. Second, the wide and deep models are cast as a multi-task learning approach, predicting all outcomes from the same model, thereby sharing common features throughout. Finally, the system may implement a mixture density network, which may produce a distribution of outcomes, thereby capturing the uncertainty of the network. Such approaches provide several advantages. First, the Bayesian nature of mixture density networks allows the system to treat all losses in terms of a probabilistic likelihood and therefore allow for regression and classification tasks to be performed simultaneously. Second, the approach is multi-task, which forces a model to learn globally relevant features about the game. Finally, by modeling the outputs as a multi-dimensional distribution, the system captures relationships between the outputs as well as providing uncertainties about the predictions.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to event data, such as, but not limited to, game event information (play, tackle, possession, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and multi-task prediction agent 120. Each of pre-processing engine 116 and multi-task prediction agent 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may include play-by-play information for each match. In some embodiments, non-spatial event data may be derived from spatial event data. For example, pre-processing engine 116 may be configured to parse the spatial event data to derive information about the event. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

Pre-processing agent 116 may be configured to process data retrieved from data store 118. For example, pre-processing agent 116 may be configured to generate one or more sets of information that may be used to train one or more neural networks associated with multi-task prediction agent 120. Pre-processing agent 116 may scan each of the one or more game files stored in data store 118 to identify one or more metrics corresponding to each tackle. For example, pre-pre-processing agent 116 may scan each of the one or more game files in data store 118 to identify one or more plays (e.g., one or more tackles, one or more offensive sets, etc.) in each game, and identify one or more metrics associated therewith (e.g., the current score, the position of the ball, the subsequent play-by-play event sequence, the players and teams involved, the team in possession of the ball, tackle number, time remaining, and the like).

Multi-task prediction agent 120 may be configured to generate multi-modal predictions based on the current state of a match. For example, multi-task prediction agent 120 may be configured to analyze a state of a game across multiple time resolutions: play, set, and game. Accordingly, in any given situation, multi-task prediction agent 120 may be configured to predict:

Play selection [$y_p$]: likelihood a team will perform a certain play (e.g., an offensive kick, defensive kick, run a normal offensive play on the next tackle, etc.)

Expected Meters (tackle) [$y_m$]: predicted meters gained/lost on the play (e.g., next tackle).

Expected Try (tackle) [$y_{tt}$]: likelihood of scoring a try on the play (e.g., next tackle).

Expected Try (set) [$y_{ts}$]: likelihood of scoring a try at some point during that possession (e.g., set).

Win Probability [$y_w$]: likelihood of winning the game.

Scoreline Prediction [$y_s$]: predicted final score of each team.

By strategically framing the problem as a model whose output may be thought of as a state-vector of the match, multi-task prediction agent 120 improves upon conventional prediction systems which fail to share information and structure that is common across tasks and often difficult to maintain in a production environment.

Multi-task prediction agent 120 may include mixture density network 126 and interface module 128. Mixture density network 126 may be configured to provide a multi-modal prediction given the state of the game across multiple time resolutions (e.g., play, set, and game), For example, multi-task prediction agent 120 may be configured to generate a multi-modal prediction based on spatial and contextual information of a particular match.

Mixture density networks are a class of models which combine neural networks and mixture density models. As such, mixture density networks are naturally Bayesian and allows multi-task prediction agent 120 to model conditional probability distribution p (t|x), where t may represent the parameters which describe the distributions generating game-state vector [$y_p, y_y, y_{tt}, y_{ts}, y_w, y_s$], where x may represent the input vector. As such, there may be a single loss for the prediction, i.e., the negative log-likelihood that a game-state may be observed given the current game-state. Additionally, the loss over the full distribution may constrain the model to learn one or more relationships between the outputs, for example, that it would be unlikely to observe a high value for meters gained but a low value for an expected try.

The mixture part of mixture density network 126 may allow multi-task prediction agent 120 to capture the multi-modality of the underlying distribution. This may produce various "modes" of the game, such as lopsided contests or very close scenarios. Mixture density network 126 may also provide insight into the uncertainty of such models by allowing multi-task prediction agent 120 to generate a distribution of outcomes—opposed to just a mean—for any given prediction.

Interface agent 128 may be configured to generate one or more graphical representations corresponding to the multi-modal prediction generated by mixture density network 126. For example, interface agent 128 may be configured to generate one or more graphical user interfaces (GUIs) that include graphical representations of each prediction generated by mixture density network 126 in the plurality of generated predictions. Exemplary GUIs are discussed below in conjunction with FIGS. 5-6C.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 126. Application 126 may be representative of a web browser that allows access to a website or a stand-alone application. Client device 108 may access application 126 to access one or more functionalities of organization computing system 104. Client device 108 may communicate over network 105 to request a webpage, for example, from web client application server 114 of organization computing system 104. For example, client device 108 may be configured to execute application 126 to access content managed by web client application server 114. The content that is displayed to client device 108 may be transmitted from web client application server 114 to client device 108, and subsequently processed by application 126 for display through a graphical user interface (GUI) of client device 108.

Figure 2:
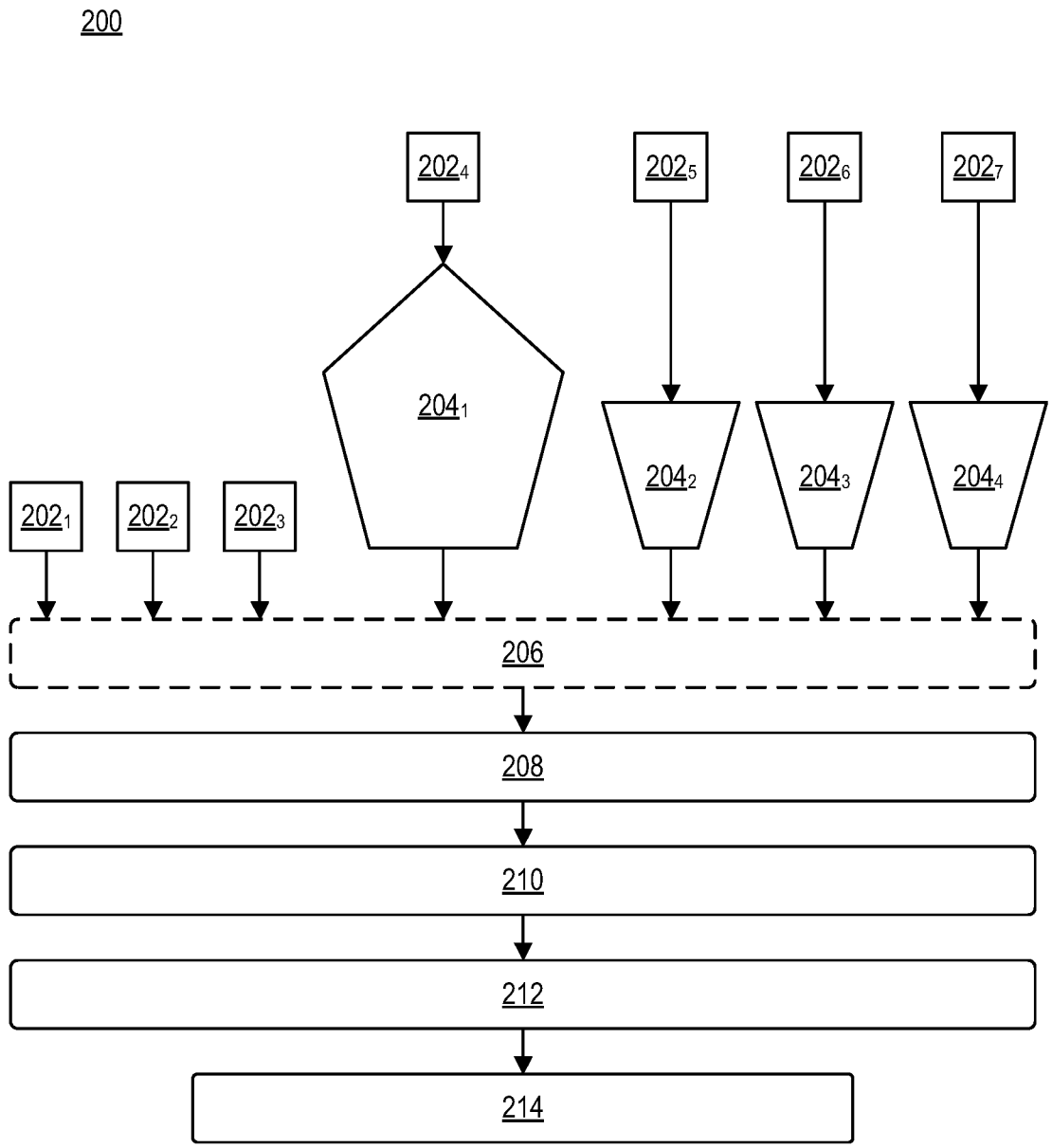
FIG. 2 is a block diagram illustrating a structure of a mixture density network, according to example embodiments.

FIG. 2 is a block diagram illustrating mixture density network (MDN) structure 200, according to example embodiments. MDN structure 200 may represent mixture density network 126.

Multi-task prediction agent 120 leverages both spatial and contextual information to make predictions about the outcome at the play, possession, and/or game-level. Some of the challenges faced in modeling this information include:
- Raw spatial data is low-dimensional and densely represented.
- Spatial feature are inherently non-linear.
- Contextual features (e.g., teams, tackle) are discrete and may be sparse.
- The relationship between spatial and contextual features is non-linear.

To address these points, multi-task prediction agent 120 may utilize mixture density network 126. Mixture density network 126 may include one or more deep portions of the network configured to construct higher-level, dense features from the originally sparse inputs.

For example, as illustrated, MDN structure 200 may include one or more inputs $202_1$-$202_7$ (generally "input 202"), one or more embedding layers $204_1$-$204_4$ (hereinafter "embedding layer 204"), one or more inputs 206, a fully connected layer 208, a fully connected layer 210, a mixture density layer 212, and an output layer 214.

One or more inputs 202 may be selected from data store 208. Each set of inputs 202 may correspond to a respective tackle. Input $202_1$ may be directed to the score difference at the time of a respective play or tackle. Input $202_2$ may be directed to the time remaining in the match at the time of the respective play or tackle. Input $202_3$ may correspond to the position (e.g., x,y coordinates) of the ball at the time of the respective play or tackle. Inputs $202_1$-$202_3$ may be considered "continuous" or dense features.

Input $202_4$ may correspond to the position (e.g., x, y coordinates) of the ball at the time of the respective play or tackle. Input $202_5$ may correspond to tackle number and back-to-back. Input $202_6$ may correspond to team ID and season ID. Input $202_7$ may correspond to opponent ID and season ID. Inputs $202_4$-$202_7$ may be considered sparse features.

In some embodiments, for purposes of training, multi-task prediction agent 120 may implement data from several seasons of league data. Using a specific example, multi-task prediction agent 120 may implement data from the 2015-2018 National Rugby League. Such data may include over 750 games and more than 250,000 distinct tackles (i.e., plays). At each tackle, the data set may include the position of the ball, the subsequent play-by-play event sequence, the players and teams involved, the team in possession of the ball, and game context (e.g., tackle number, score, time remaining, etc.).

A uniqueness to the approach taken by multi-task prediction agent 120 is how categorical (i.e., contextual) features, such as season and team/opponent identity are represented. Such features, for example, may be represented as one-hot vector. For example, as opposed to creating an embedding for season, team, and opponent independently, multi-task prediction agent 120 may concatenate the one-hot vector of season with the one-hot vector of team (and similarly for opponent). This enables multi-task prediction agent 120 to share identity information across seasons, capturing the notion that teams may maintain a level of similarity across years, while also picking up on league-wide trends over different seasons. A similar approach may be taken to capture the tackle number (e.g., tackle #1 through tackle #6) and back-to-back sets (e.g., represented by a binary flag).

For each categorical feature (e.g., inputs $202_5$-$205_7$), multi-task prediction agent 120 may pass each feature through its own "deep" portion of mixture density network 126 to construct higher-level, dense features, from the originally sparse inputs, thus creating an embedding vector. For example, multi-task prediction agent 120 may pass each categorical feature through a dedicated embedding layer 204. As illustrated, input $202_5$ may be passed through embedding layer $204_2$; input $202_6$ may be passed through embedding layer $204_3$; and input $202_7$ may be passed through embedding layer $204_4$. The output from embedding layers $204_2$-$204_4$ may be an embedding vector that includes higher-level, dense features, corresponding to the original features represented by inputs $202_5$-$202_7$. Embedding vector may be concatenated with one or more dense inputs 202 (e.g., inputs $202_1$-$202_3$).

As illustrated, inputs directed to position are provided twice to MDN structure 200. For example, position is illustrated as both a dense input (e.g., input $202_1$) and a sparse input (e.g., input $202_4$). Generally, playing surface position may be considered a dense, two dimension (e.g., x, y) input. In a traditional wide and deep model, such values would simply be concatenated at the embedding layer. However, the shallowness of the wide portion of these models prevents extraction of high-level spatial features from the playing surface position data. To address this, playing surface position may be treated as both a sparse and dense feature.

For the sparse portion of the inputs 202 (e.g., input $202_4$), multi-task prediction agent 120 may pass the sparse inputs through several layers (e.g., layer $204_1$) similar to the one or more categorical features. In some embodiments, multi-task prediction agent 120 may initially boost input data from the original two-dimensions up to fifty at a first hidden layer. This may provide the network sufficient dimensionality to mix the inputs and create higher-level features. Traditionally, the low dimensionality of spatial input has been addressed by fully discretizing the playing surface position, i.e., by treating the playing surface position as a grid and representing the position as a one-hot vector indicating the occupancy in that bin. Such approach as several limitations. First, the discrete representation may be inherently lossy, as positions are effectively rounded during the binning process. Second, the resulting dimensionality may be massive (e.g., 70 m×100 m playing surface broken into ⅓ m×⅓ m bins, results in 63,000 dimensional input). Expanding the dimensionality to thousands or tens-of-thousands may be unnecessarily high and may result in a sparse representation, requiring more neurons and more data. The present approach avoids such pitfalls by working directly on the raw spatial input, moderately increasing the dimensionality of the first hidden layer, and then allowing mixture density network 126 to extract spatial relationships from this data. As such, due to the importance of the playing surface position in all prediction tasks, playing surface position is included not only as dense feature, but also a sparse feature, thus allowing mixture density network 126 to capture both low-level (e.g., raw), as well as high-level (e.g., embedded) spatial information. Accordingly, the output from layer $204_1$ may be concatenated with inputs $202_1$-$202_3$ and the embedding vector. Such concatenated data set may be considered input layer 206.

The one or more inputs from input layer 206 may be provided to fully connected layer 208. Output from fully connected layer 208 may be provided, as input, to fully connected layer 210.

Mixture density layer 212 may include one or more mixtures (e.g., five) each with a prediction for μ and σ. Mixture density layer 212 may receive, as input, output from fully connected layer 210.

Mixture density layer 212 may generate one or more outputs 214. For example, mixture density layer 212 may generate, as output, simultaneous (or near simultaneous) predictions for expected meters ($y_m$), expected try tackle ($y_{tt}$), expected try set ($y_{ts}$), win probability ($y_w$), and final scoreline ($y_s$)—collectively, state vector.

In some embodiments, during training, cross-entropy may be used as the loss function. For example, a single loss may be generated across the entire state vector. Thus, even if several components in a prediction are very good, the loss may be quite high if the state is inconsistent (e.g., a positive final scoreline prediction, but a low win probability are inconsistent and therefore may have a high loss).

Figure 3:
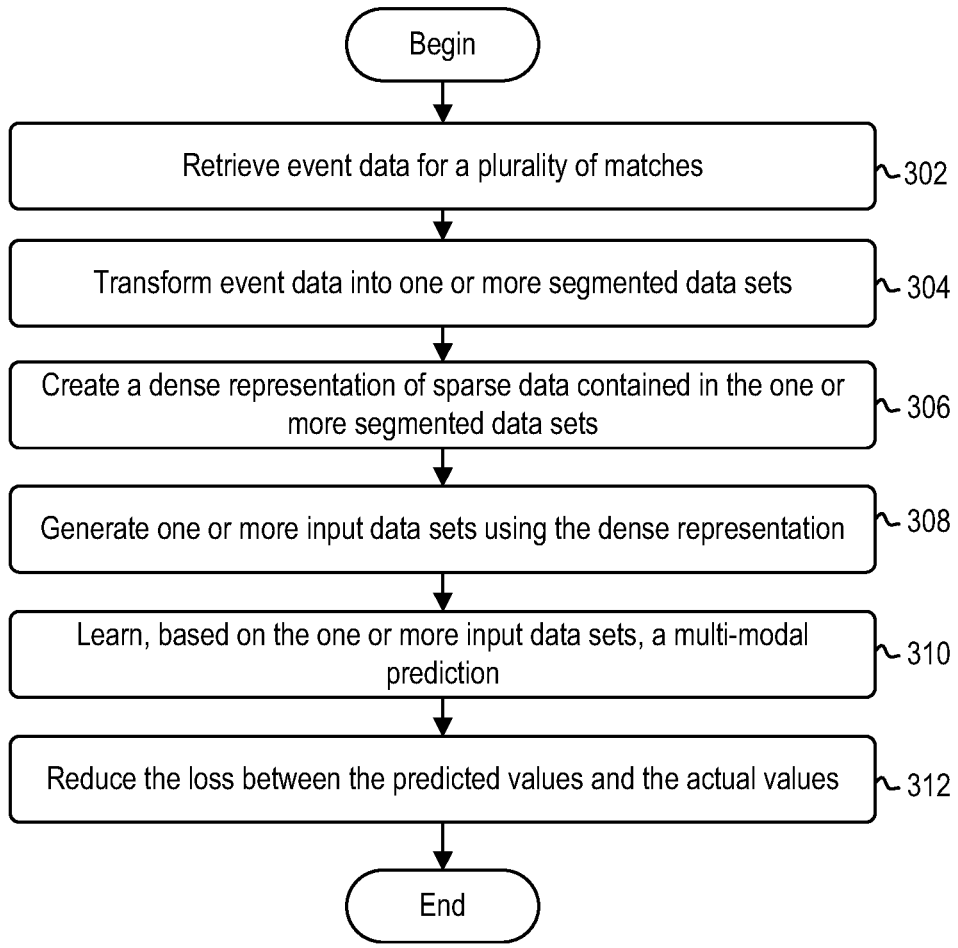
FIG. 3 is a flow diagram illustrating a method of generating a fully trained prediction model, according to example embodiments.

FIG. 3 is a flow diagram illustrating a method 300 of generating a fully trained prediction model, according to example embodiments. Method 300 may begin at step 302.

At step 302, organization computing system 104 may retrieve event data for a plurality of matches. For example, pre-processing agent 116 may retrieve spatial event data from data store 118. Spatial event data may capture every touch of the ball, with x, y coordinates and time stamps, as well as non-spatial event data, i.e., one or more variables describing one or more events without associated spatial information. In some embodiments, pre-processing agent 116 may be configured to parse through the retrieved event data to generate one or more sets of data corresponding to each play or tackle in each match. In some embodiments, organization computing system 104 may further retrieve non-spatial event data from data store 118.

At step 304, organization computing system 104 may transform the event data (e.g., at least one of spatial event data and non-spatial event data) into one or more segmented data sets. For example, pre-processing agent 116 may generate a segmented data set for each play or tackle identified in the event data. Such segmented data set may include, but is not limited to, playing surface position, the subsequent play-by-play event sequence, the players and teams involved, the team in possession of the ball, and game context (e.g., play, tackle number, score, time remaining, etc.).

At step 306, organization computing system 104 may create a dense representation of sparse data contained in the one or more segmented data sets. For example, multi-task prediction agent 120 may select a subset of the one or more segmented data set for which to generate a dense representation. In some embodiments, the subset may include "sparse" data that includes, but is not limited to, game context information (e.g., play number, tackle number, back-to-back information, etc.), team ID/season ID, and opponent ID/season ID. Multi-task prediction agent 120 may provide each set of data to a respective embedding layer. For example, multi-task prediction agent 120 may provide game context information as input to a first embedding layer, team ID/season ID information to a second embedding layer, and opponent ID/season ID information to a third embedding layer. Each embedding layer may produce, as output, a dense representation of the respective input data. Collectively, such information may be referred to as an embedding vector.

At step 308, organization computing system 104 may generate one or more input data sets using the embedding vector. For example, multi-task prediction agent 120 may concatenate the embedding vector with one or more continuous features. Such continuous features may include, but are not limited to, score difference, time remaining, and playing surface position (e.g., x, y coordinates). In some embodiments, one or more input data sets may further include higher-level spatial information. For example, multi-task prediction agent 120 may generate higher-level spatial information based on playing surface position features (e.g., x, y coordinates). Multi-task prediction agent 120 may generate such higher-level spatial information by passing position information through several layers. The output, generated by the several layers, may be concatenated with the continuous features and the embedding layer to generate the one or more input data sets.

At step 310, organization computing system 104 may learn, based on the one or more input data sets, a multi-modal prediction. For example, multi-task prediction agent 120 may be configured to train mixture density network 126 using the one or more input data sets to generate a multi-modal prediction.

In some embodiments, mixture density network 126 may simultaneously, or near-simultaneously, generate predictions for at least one of: expected meters ($y_m$), expected try tackle ($y_{tt}$), expected try set ($y_{ts}$), win probability ($y_w$), expected play selection ($y_p$), and final score line ($y_s$). As such, mixture density network may output a game state vector [$y_p, y_m, y_{tt}, y_{ts}, y_w, y_s$] for each input vector x.

Although the example illustrated above is described specifically for Rugby League, those skilled in the art recognize that such approach could be generalized for any sport, with each predictor representing a different characteristic of the game. For example, in soccer, the predictors could be expected goal ($y_g$), expected shot ($y_s$), expected foul/penalty ($y_p$), expected corner ($y_c$), win probability ($y_w$), and final score line ($y_{sl}$). In another example, for tennis the predictors may be expected ace ($y_a$), expected winning of point ($y_p$), expected break ($y_b$), win probability ($y_p$), or final score (or final score stats). In another example, for basketball the predictors may be a specific player and team predictor such as expected number of points being score by a specific player ($y_{ps}$), expected number of rebounds per specific player ($y_{pr}$), win probability ($y_w$), and final score prediction ($y_s$).

At step 312, organization computing system 104 may reduce any loss between the predicted values and the actual values. For example, as part of the training process, multi-task prediction agent 120 may reduce the negative-log likelihood that a game state is observed given the current game-state. In some embodiments, multi-task prediction agent 120 may use a cross-entropy function for such processes.

Figure 4:
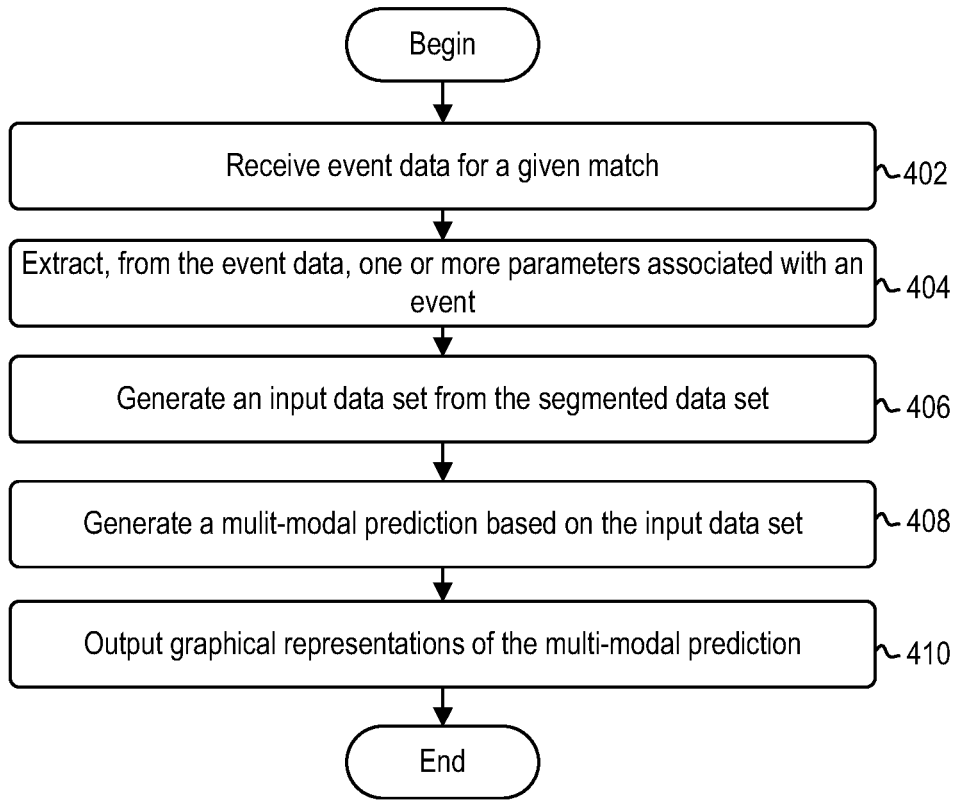
FIG. 4 is a flow diagram illustrating a method of generating a multi-task prediction using the fully trained prediction model, according to example embodiments.

FIG. 4 is a flow diagram illustrating a method 400 of generating a multi-task prediction using the fully trained prediction model, according to example embodiments. Method 400 may begin at step 402.

At step 402, organization computing system 104 may receive match data for a given match. For example, pre-processing agent 116 may receive information (e.g., tackle information) for a given play in a particular match. In some embodiments, pre-processing agent 116 may receive match data from tracking system 102. In some embodiments, pre-processing agent 116 may receive match data from client device 108. For example, a user, via application 132, may request that a multi-modal prediction be made for a given tackle in a given match.

At step 404, organization computing system 104 may extract, from the match data, one or more parameters associated with an event. For example, pre-processing agent 116 may be configured to generate one or more input values for artificial neural network 126 by selectively extracting one or more parameters associated with the event (e.g., a tackle). In some embodiments, the one or more parameters may include, but are not limited to, playing surface position, the subsequent play-by-play event sequence, the players and teams involved, the team in possession of the ball, and game context (e.g., tackle number, score, time remaining, etc.).

At step 406, organization computing system 104 may generate an input data set from the one or more extracted parameters. For example, multi-task prediction agent 120 may create a dense representation of sparse data contained in the one or more segmented data sets. Multi-task prediction agent 120 may select a subset of the one or more segmented data set for which to generate a dense representation. In some embodiments, the subset may include "sparse" data that includes, but is not limited to, game context information (e.g., play number, tackle number, back-to-back information, etc.), team ID/season ID, and opponent ID/season ID. Multi-task prediction agent 120 may provide each set of data to a respective embedding layer. For example, multi-task prediction agent 120 may provide game context information as input to a first embedding layer, team ID/season ID information to a second embedding layer, and opponent ID/season ID information to a third embedding layer. Each embedding layer may produce, as output, a dense representation of the respective input data. Collectively, such information may be referred to as an embedding vector. Multi-task prediction agent 120 may generate higher-level spatial information based on playing surface position features (e.g., x, y coordinates). Multi-task prediction agent 120 may generate such higher-level spatial information by passing position information through several layers. The output, generated by the several layers, may be concatenated with the embedding layer and one or more continuous features (e.g., score difference, time remaining, and playing surface position (e.g., x, y coordinates)) to generate the one or more input data sets.

At step 408, organization computing system 104 may generate a multi-modal prediction based on the input data set. For example, multi-task prediction agent 120 may generate one or more predictions about a particular tackle at the play, possession, and game levels. Multi-task prediction agent 120 may generate the one or more predictions using mixture density network 126. For example, multi-task prediction agent 120 may provide, as input, to mixture density network 126 the extracted one or more parameters associated with the event. Multi-task prediction agent 120 may generate, as output, a multi-modal prediction. For example, mixture density network 126 may simultaneously, or near-simultaneously, generate predictions for at least one of: expected meters ($y_m$), expected try tackle ($y_{tt}$), expected try set ($y_{ts}$), win probability ($y_w$), expected play selection ($y_p$), and final score line ($y_s$). As such, mixture density network 126 may output a game state vector [$y_p, y_m, y_{tt}, y_{ts}, y_w, y_s$] for each input vector x.

At step 410, organization computing system 104 may generate one or more graphical representations of the multi-modal prediction. For example, interface agent 128 may generate one or more graphical representations that illustrate one or more metrics predicted by mixture density network 126. Exemplary graphical representations may be found below in conjunction with FIG. 5.

Figure 5:
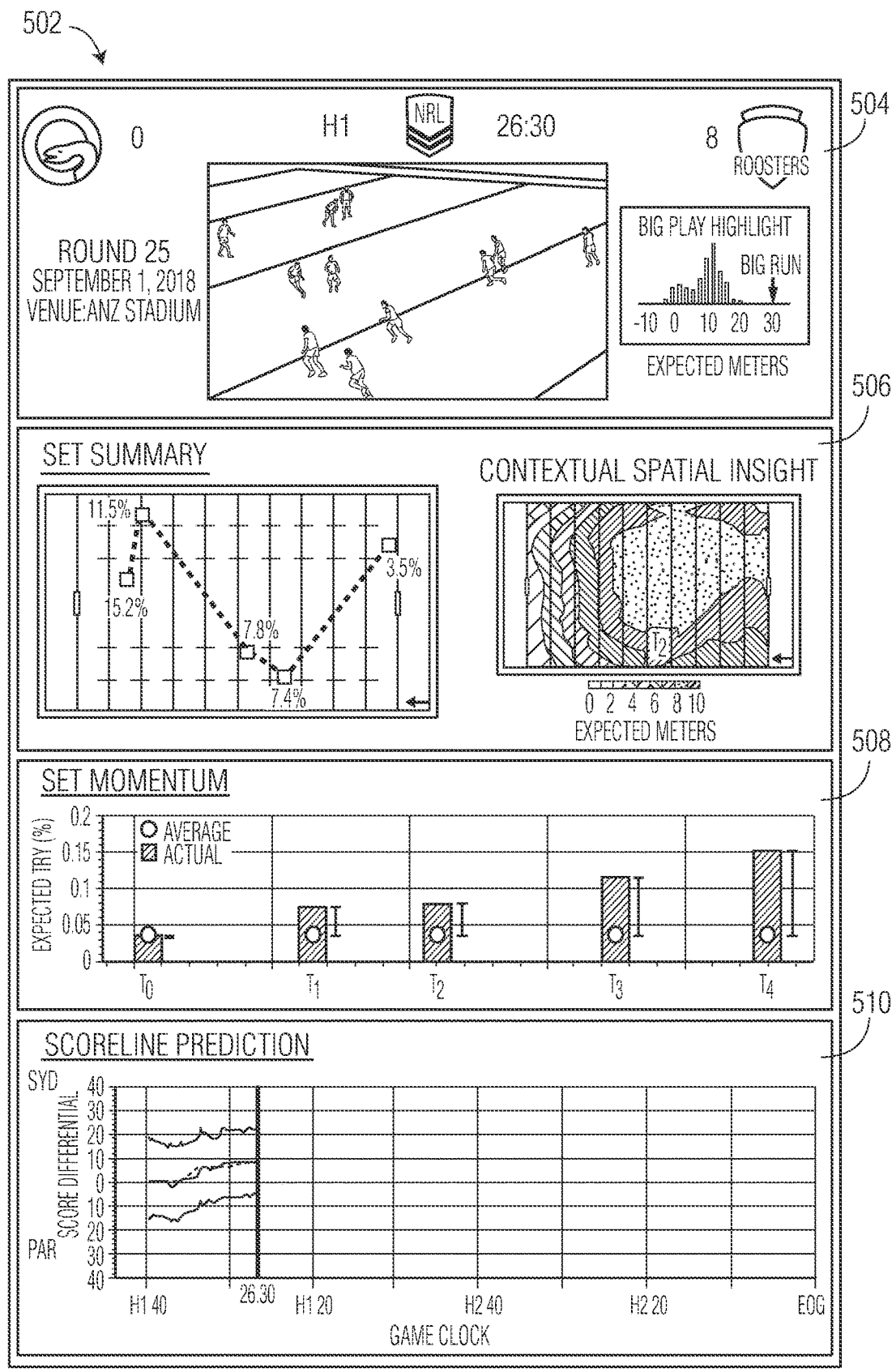
FIG. 5 is a block diagram of a graphical user interface, according to example embodiments.

FIG. 5 is a block diagram of a graphical user interface (GUI) 502, according to example embodiments. GUI 502 may include a first section 504, a second section 506, a third section 508, and a fourth section 510.

First section 504 may include video and game information for a given match. For example, as illustrated, first section 504 may include score information, half information, time information, and event information. First section 504 may further include video information for the match. In some embodiments, first section 504 may include a live (or delayed) feed of the match. In some embodiments, first section 504 may include video highlights of a particular match. First section 504 may further include a big play highlight chart. Big play highlight chart may illustrate the big plays of the game.

Second section 506 may visually illustrate spatial information of each tackle in addition to an expected try set value for that set at each tackle. For example, as illustrated, second section 506 may illustrate a complete "set" (i.e., Rugby League's equivalent of a "drive" in American Football) from the Round of 25 of the 2018 NRL Season with the Roosters in possession against the Eels. In the "Set Summary", interface agent 128 may graphically illustrate the likelihood the Roosters will score a try during that set at the start of each tackle. As shown, the Roosters initially field the ball in terrible field position and only have a 3.5% chance of scoring. However, a great return boosts the Roosters' likelihood of scoring to 7.4% at the start of their first tackle. A huge run during the second tackle raised the likelihood of scoring further to 11.5%, and a good central field position on the fourth tackle sees it grow to 15.2%. Unfortunately for the Roosters, after a bad fifth tackle, they elect to kick in an attempt to recover the ball and turn the ball over. Second section 506 may further include a graphical representation illustrating the context of a big tackle by exploring the expected meters gained as a function of field location in the "Contextual Spatial Insights" panel. This panel illustrates the expected meters as a function of, not only the field position, but also the full context (i.e., tackle, number, team, scoreline, and opponent). In the plot, interface agent 128 may illustrate the advantaged gained by starting a tackle near the middle of the pitch (i.e., the field).

Third section 508 may provide a visual representation of team momentum. Momentum over a set of six tackles may be considered an important concept in Rugby League. Multi-task prediction agent 120 may be configured to track momentum by comparing the current try set to the average for that context (i.e., playing surface position, time, scoreline, team identities, etc.). In the example shown in FIG. 5, a boost in momentum both from the runback after the initial possession as well as the big run on the second tackle are shown. Multi-task prediction agent 120 may allow users to identify big runs, not only in terms of the meters gained, but also in how exceptional that run was given that context.

Fourth section 510 may provide a visual representation of scoreline predictions. In this plot, interface agent 128 may illustrate not only the current score differential (dashed line) as determined by multi-track prediction agent, but also a prediction of the end-of-game score differential. In other words, multi-task prediction agent 120 is not limited to predicting a final value, but may also predict a score distribution.

In some embodiments, multi-task prediction agent 120 may leverage output from mixture density network 126 to generate a DVOA value for Rugby League. For example, similar to American Football, Rugby League includes segmented plays where the fight for playing surface position is key and not all yards/meters are equal, even though they may appear so in the box score. The expected try set prediction (i.e., $y_{ts}$) may represent the predicted chance of scoring during the set for every play (e.g., tackle). The prediction, similar to football's DVOA, considers the score, time, opponent, and location. Taking the difference between the expected value and the actual value, multi-task prediction agent 120 can output whether the team outperforms their expectations. In some embodiments, to create a more interpretable DVOA, multi-task prediction agent 120 may scale the values with a mean of zero. A positive offensive DVOA and a negative defensive DVOA may correspond to a strong offense and a strong defense, respectively.

Figure 6A:
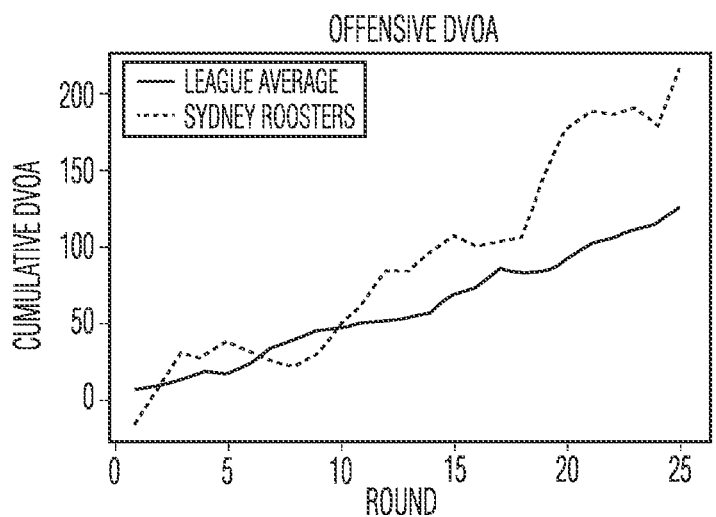
FIG. 6A is a block diagram of a graphical user interface, according to example embodiments.
Figure 6B:
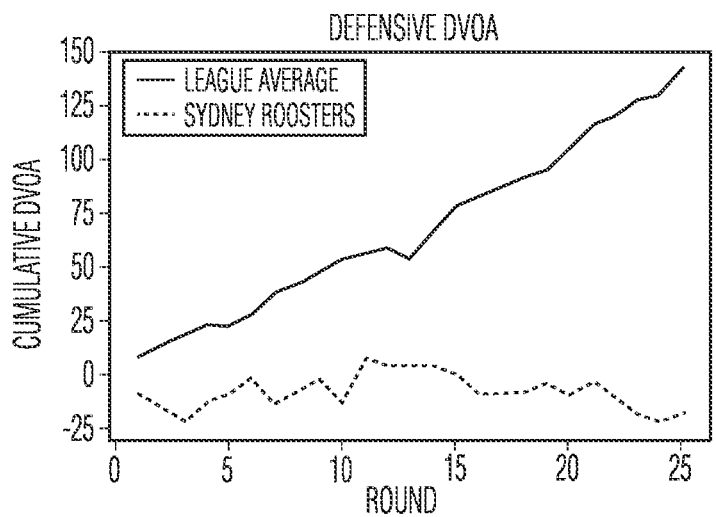
FIG. 6B is a block diagram of a graphical user interface, according to example embodiments.

FIG. 6A is a block diagram of a graphical user interface (GUI) 602, according to example embodiments. FIG. 6B is a block diagram of a graphical user interface (GUI) 612, according to example embodiments. As shown, GUI 602 includes a chart that breaks down the offensive strength of the Roosters over the course of a season as compared to the league average. GUI 612 includes a chart that breaks down the defensive strength of the roosters over the course of the season as compared to the league average.

Initially, the Roosters got off to a slow start, largely on-par with the league average (they started the season with a 4-4 record). However, by mid-season, the Roosters began to find their form. The offensive DVOA allows users to track how the Roosters went from average to great in the second half of the season. Defensively, the Roosters were dominant all season, as illustrated in GUI 612. They maintained their strong form, even as the league worsened in defensive DVOA.

Figure 6C:
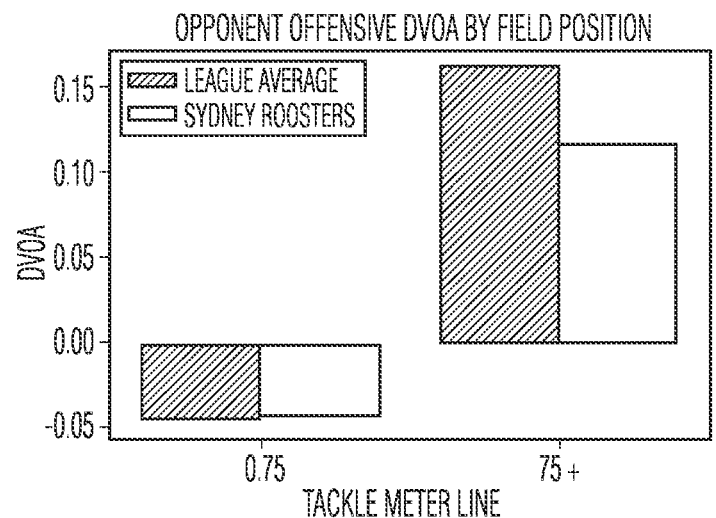
FIG. 6C is a block diagram of a graphical user interface, according to example embodiments.

FIG. 6C is a block diagram of a graphical user interface (GUI) 622, according to example embodiments. Because multi-task prediction agent 120 can also make predictions on an individual player level, users may be able to dive deeper into the Roosters' success and reveal where their defense outperformed their opponents. As illustrated, GUI 622 shows that the Roosters defense was average during plays occurring in the first three-quarters of the playing surface (note, that both the Roosters and the league average have a negative DVOA in these situations as they rarely result in scoring). However, in critical moments, such as the final 25 m of the pitch, the Roosters were incredible strong with their defensive DVOA being maintained at around 0.12 while the league-average was over 0.15 in key situations.

Figure 7A:
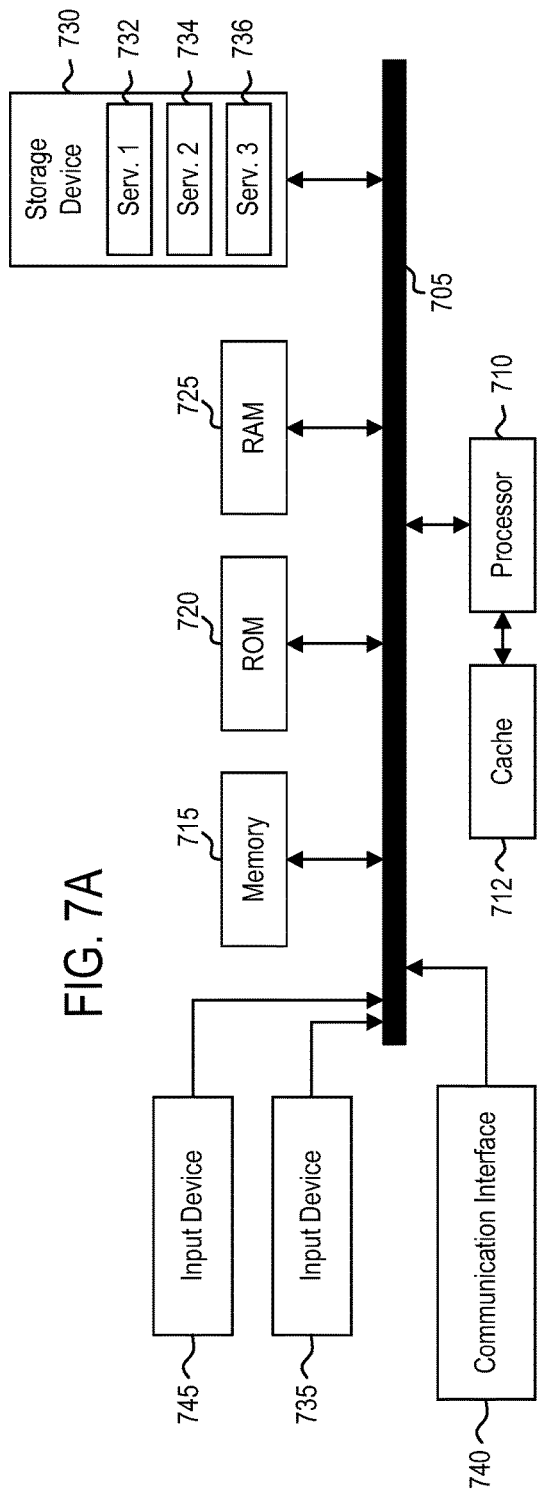
FIG. 7A is a block diagram illustrating a computing device, according to example embodiments.

FIG. 7A illustrates a system bus computing system architecture 700, according to example embodiments. System 700 may be representative of at least a portion of organization computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing device 700, an input device 745 may represent any number of input mechanisms, such as a microphone for speech, a touch-sensitive screen for gesture or graphical input, keyboard, mouse, motion input, speech and so forth. An output device 735 may also be one or more of a number of output mechanisms known to those of skill in the art. In some instances, multimodal systems may enable a user to provide multiple types of input to communicate with computing device 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, display 735, and so forth, to carry out the function.

Figure 7B:
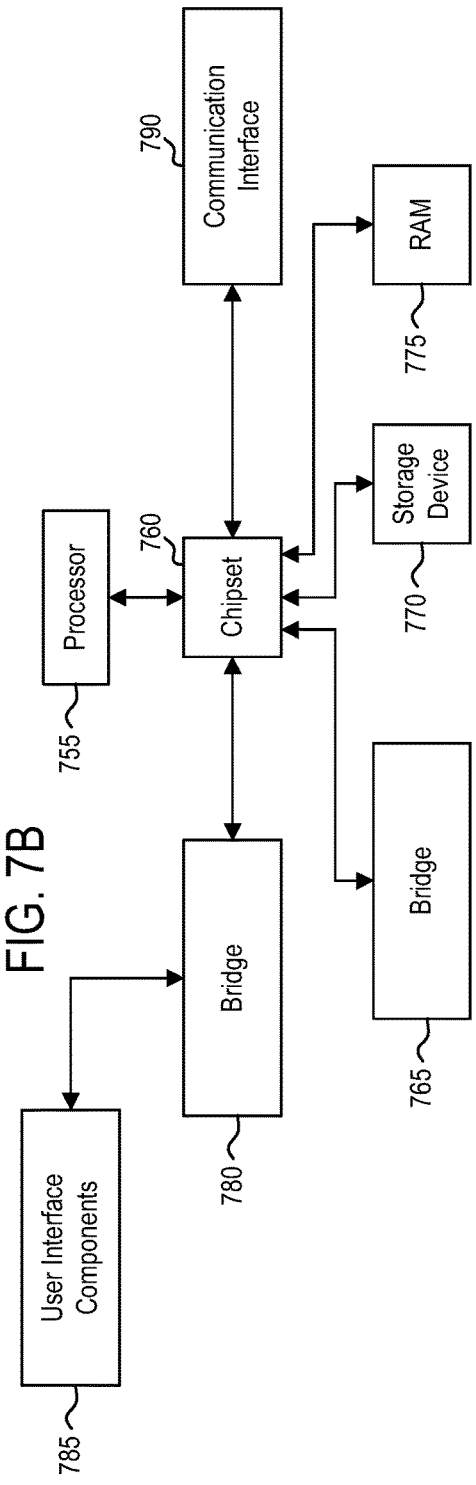
FIG. 7B is a block diagram illustrating a computing device, according to example embodiments.

FIG. 7B illustrates a computer system 750 having a chipset architecture that may represent at least a portion of organization computing system 104. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage 770 or 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating a multi-modal prediction, comprising:
    identifying, by a computing system, information related to a sporting event, the information comprising dense features of the sporting event and sparse features of the sporting event;
    generating, by the computing system, dense representations of the sparse features using one or more embedding layers of a machine learning architecture;
    generating, by the computing system, an input vector comprising the dense features and the dense representations of the sparse features;
    simultaneously generating, by the computing system using a mixture density layer of the machine learning architecture, a plurality of values associated with a next event to occur based on the input vector; and
    outputting, by the computing system, a graphical user interface comprising graphical representations of the plurality of values.

2. The method of claim 1, wherein the dense features comprise a current score, time remaining, and ball position.

3. The method of claim 1, wherein the sparse features comprise ball position, play number, team identifiers, and season identifiers.

4. The method of claim 3, wherein generating, by the computing system, the dense representations of the sparse features using the one or more embedding layers of the machine learning architecture comprises:
    generating a first dense representation of the ball position by passing the ball position through a first embedding layer;
    generating a second dense representation of the play number by passing the play number through a second embedding layer;
    generating a third dense representation of the team identifiers by passing the team identifiers through a third embedding layer; and generating a fourth dense representation of the season identifiers by passing the season identifiers through a fourth embedding layer.

5. The method of claim 1, wherein the plurality of values comprises two or more of predictions for expected meters or yards, expected try tackles, expected try set, win probability, or final score line.

6. The method of claim 1, wherein generating, by the computing system, the input vector comprising the dense features and the dense representations of the sparse features comprises:
concatenating the dense representations of the sparse features with the dense features.

7. The method of claim 1, wherein simultaneously generating, by the computing system using the mixture density layer of the machine learning architecture, the plurality of values associated with the next event to occur based on the input vector comprises:
generating an output vector comprising each of the plurality of values.

8. A non-transitory computer readable medium comprising one or more sequences of instructions, which, when executed by one or more processors, causes a computing system to perform operations comprising:
identifying, by the computing system, information related to a sporting event, the information comprising dense features of the sporting event and sparse features of the sporting event;
generating, by the computing system, dense representations of the sparse features using one or more embedding layers of a machine learning architecture;
generating, by the computing system, an input vector comprising the dense features and the dense representations of the sparse features;
simultaneously generating, by the computing system using a mixture density layer of the machine learning architecture, a plurality of values associated with a next event to occur based on the input vector; and
outputting, by the computing system, a graphical user interface comprising graphical representations of the plurality of values.

9. The non-transitory computer readable medium of claim 8, wherein the dense features comprise a current score, time remaining, and ball position.

10. The non-transitory computer readable medium of claim 8, wherein the sparse features comprise ball position, play number, team identifiers, and season identifiers.

11. The non-transitory computer readable medium of claim 10, wherein generating, by the computing system, the dense representations of the sparse features using the one or more embedding layers of the machine learning architecture comprises:
generating a first dense representation of the ball position by passing the ball position through a first embedding layer;
generating a second dense representation of the play number by passing the play number through a second embedding layer;
generating a third dense representation of the team identifiers by passing the team identifiers through a third embedding layer; and
generating a fourth dense representation of the season identifiers by passing the season identifiers through a fourth embedding layer.

12. The non-transitory computer readable medium of claim 8, wherein the plurality of values comprises two or more of predictions for expected meters or yards, expected try tackles, expected try set, win probability, or final score line.

13. The non-transitory computer readable medium of claim 8, wherein generating, by the computing system, the input vector comprising the dense features and the dense representations of the sparse features comprises:
concatenating the dense representations of the sparse features with the dense features.

14. The non-transitory computer readable medium of claim 8, wherein simultaneously generating, by the computing system using the mixture density layer of the machine learning architecture, the plurality of values associated with the next event to occur based on the input vector comprises:
generating an output vector comprising each of the plurality of values.

15. A system, comprising:
a processor; and
a memory having programming instructions stored thereon, which, when executed by the processor, causes the system to perform operations comprising:
identifying information related to a sporting event, the information comprising dense features of the sporting event and sparse features of the sporting event;
generating dense representations of the sparse features using one or more embedding layers of a machine learning architecture;
generating an input vector comprising the dense features and the dense representations of the sparse features;
simultaneously generating, using a mixture density layer of the machine learning architecture, a plurality of values associated with a next event to occur based on the input vector; and
outputting a graphical user interface comprising graphical representations of the plurality of values.

16. The system of claim 15, wherein the dense features comprise a current score, time remaining, and ball position.

17. The system of claim 15, wherein the sparse features comprise ball position, play number, team identifiers, and season identifiers.

18. The system of claim 17, wherein generating the dense representations of the sparse features using the one or more embedding layers of the machine learning architecture comprises:
generating a first dense representation of the ball position by passing the ball position through a first embedding layer;
generating a second dense representation of the play number by passing the play number through a second embedding layer;
generating a third dense representation of the team identifiers by passing the team identifiers through a third embedding layer; and
generating a fourth dense representation of the season identifiers by passing the season identifiers through a fourth embedding layer.

19. The system of claim 15, wherein the plurality of values comprises two or more of predictions for expected meters or yards, expected try tackles, expected try set, win probability, or final score line.

20. The system of claim 15, wherein generating the input vector comprising the dense features and the dense representations of the sparse features comprises:

concatenating the dense representations of the sparse features with the dense features.

* * * * *